(12) United States Patent
Pieneman (10) Patent No.: US 12,540,876 B2
(45) Date of Patent: Feb. 3, 2026

(54) SYSTEM AND METHOD FOR DETERMINING THE LOCATION OF A LEAK WITHIN A LONGITUDINAL PIPE

(71) Applicant: Michael Pieneman, Heerhugowaard (NL)

(72) Inventor: Michael Pieneman, Heerhugowaard (NL)

( * ) Notice: Subject to any disclaimer, the term of this patent is extended or adjusted under 35 U.S.C. 154(b) by 134 days.

(21) Appl. No.: 18/128,187

(22) Filed: Mar. 29, 2023

(65) Prior Publication Data

US 2024/0230454 A1   Jul. 11, 2024

Related U.S. Application Data

(60) Provisional application No. 63/325,071, filed on Mar. 29, 2022.

(51) Int. Cl.
*G01M 3/24* (2006.01)

(52) U.S. Cl.
CPC .................. *G01M 3/243* (2013.01)

(58) Field of Classification Search
CPC ..... G01M 3/00; G01M 3/24–28; G01M 3/243
See application file for complete search history.

(56) References Cited

U.S. PATENT DOCUMENTS

| | | | | |
|---|---|---|---|---|
| 8,665,101 B2 * | 3/2014 | Solomon | ................... | G01F 1/66 73/152.58 |
| 11,726,064 B2 * | 8/2023 | Burtea | ................... | G01N 29/07 702/159 |
| 2019/0128766 A1 | 5/2019 | Burtea | | |
| 2020/0003646 A1 | 1/2020 | Krywyj et al. | | |

FOREIGN PATENT DOCUMENTS

| | | | | |
|---|---|---|---|---|
| WO | WO-2021220371 A1 * | 11/2021 | ............. | G01M 3/24 |
| WO | WO2024201138 | 10/2024 | | |

OTHER PUBLICATIONS

Machine Translation of WO-2021220371-A1 (Year: 2021).*

* cited by examiner

*Primary Examiner* — Nguyen Q. Ha
(74) *Attorney, Agent, or Firm* — MALLOY & MALLOY, PL (57) ABSTRACT

Various embodiments of the present invention are directed to a leak localization system configured to identify the presence of a leak within a pipe system and locate the same to a high degree of accuracy. At least one embodiment of such a leak localization system may comprise an emitting device configured in connection with an amplification device for the propagation of an acoustic pulse throughout the pipe. Distally disposed in relation to such emitting device may be at least one frequency sensing device configured to detect the frequency of the acoustic pulse, with the intent of determining any changes thereto. Such frequency sensing device(s) may be configured to generate sensor data which may used to localize an existing leak. Such sensor data may be communicated to a control center via an interconnected control system, wherein the localized leak may subsequently be communicated to the owner of the pipe for remediation.

18 Claims, 6 Drawing Sheets

SYSTEM AND METHOD FOR DETERMINING THE LOCATION OF A LEAK WITHIN A LONGITUDINAL PIPE

CLAIM OF PRIORITY

The present Non-Provisional patent application hereby makes a claim of priority to an earlier filed and currently pending U.S. provisional patent application having Ser. No. 63/325,071 and a filing date of Mar. 29, 2022, the contents of which are hereby incorporated in its entirety.

BACKGROUND OF THE INVENTION

Field of the Invention

The present invention is directed to a leak localization system for determining the presence of a leak within a pipe system, and locating the same, for reporting to the owner thereof.

Description of the Related Art

The use of closed pipes to transport various types of mediums, such as liquids and gases, is ubiquitous throughout a variety of industries. For instance, water, oil, and natural gas are all commonly transported from one location to another through the use of pipes. Indeed, water, oil, and natural gas are often required to traverse vast distances from the originating location to the destination location. And, notably, such vast distances often comprise traversal over, or rather across, oceans, lakes, and other bodies of water.

However, as may be understood, pipes are prone to a variety of problems which may result in the loss of the fluid disposed therein. For instance, material degradation, material fatigue, and/or system failure result in leaks of the fluid and may be brought about by unknown and spontaneous changes in soil structure, temperature changes, climatic changes, static pressure changes, or even the simple aging of the piping system. Even further, theft of the fluid, which may similarly be construed as a leak, may often occur as a result of wars, strikes, riots, and other politically motivated reasons.

As may be noted, the foregoing types of issues relating to leakage from a pipe can often be difficult to predict and resolve, particularly in instances wherein the pipe at issue is at least partially submerged under a body of water. Specifically, while there exist certain structures within piping systems where leaks may be more likely to occur due to, for instance, system failure, instances of material degradation and/or fatigue, or even theft, often occur at unpredictable locales and at unpredictable times.

And, as may be understood, the efficient identification of a leak, and more pertinently the location thereof, is very important. Indeed, no matter the fluid being transported by such a pipe, any leakage therefrom understandably constitutes some degree of economic loss. However, in instances of oil and natural gas, any such leakage may further carry certain environmental and health hazards. As a result, it may be understood the efficient identification of a leak, and more pertinently the location thereof, is critically important for those operating any such popping systems.

Given the importance of identifying and remediating leakages in piping systems, conventional systems, and particularly those involved in subsea applications, focus on the permanent installation of sensors and other components configured to identify instances of fluid leakage. However, each such component suffers from various structural and functional limitations that reduce the ability of such component to efficiently identify a leak, much less accurately locate such a leak.

For instance, certain methods such as bio sensor methods, sniffer methods, and capacitance methods suffer from the requirement the same are disposed on the exterior of the piping system. As a result, such methods are unable to reliably identify and locate leaks occurring throughout the entirety of the pipeline system, at least due to the impractical nature of disposing the same along the entire length thereof. Similarly, detection methods such as fluorescent methods are insufficient as the same depend upon a light source, and thus similarly lack the ability to detect leakages along the entirety of the pipeline.

One promising method of detection pertains to active acoustic detection methods. There, a sound pulse is emitted from a sensor, wherein such sound pulse travels along a distance of the pipe. Once such sound pulse interacts with a section of the pipe that is irregular, the frequency of the sound pulse changes, with a portion of such sound pulse being reflected back to the sensor. Thus, acoustic detection methods function akin to forms of echolocation used by, for instance, dolphins or bats. However, while presently useful, conventionally implemented acoustic detection methods suffer from certain problems as well.

For instance, one issue pertaining to acoustic sensors is the limited range thereof. Specifically, although a sound wave propagates through water and other fluids more easily than air, at least in part due to the greater density of water than air, traditional acoustic sensors still have a limited propagation range of approximately 800 meters within a tube. Naturally, such a propagation range is insufficient to adequately detect leakages over the entire length of a pipeline, thus requiring numerous such sensors disposed at various points thereof.

Another issue pertaining to acoustic sensors pertains to localization. Specifically, although acoustic sensors are presently good at identifying the presence of irregularities, traditional systems are not sufficiently integrated to determine where those irregularities are actually located. Indeed, traditional systems using acoustic sensors generate excess data, a problem only exacerbated by the presence and/or possibility of interfering noises in and surrounding the pipeline. As a result, while detecting the presence of an irregularity may occur using acoustic sensors, determining where that irregularity is located, both in the sense of the piping system itself and in a geographic sense, often proves difficult, cumbersome, and costly.

Thus, simply put, the dual inadequacies of traditional active acoustic detection systems—i.e., (1) the limited range resulting in the need for a plurality of acoustic sensors within a single pipeline; and (2) the inability to localize a leak when detected—results in an inefficient system only able to detect a leak within a given range, namely, that range of pipeline between one sensor and the next. The result is an inefficient and inaccurate system inadequately tailored to identify leaks within a pipe system for the timely remediation thereof.

As such, there exists a need in the art for a pipe leakage detection system configured to continuously detect and locate leakages along the entire, or at least a substantial length of a piping system. At least one embodiment of such a pipe leakage detection system should be configured for use in connection with fluids comprising water, oil, and/or natural gas, or any other fluid commonly transported via piping systems. Any such system should, in at least one embodiment, be configured for a high degree of accuracy with respect to location determination, such that an interested party may receive an exact or near-exact location point at which a leak is believed to reside. Furthermore, such a system should be non-invasive in environmental terms, and should optionally be configured to be fully autonomous, both in the sense that the system continuously generates and collects data pertaining to pipe leakages, as well as in the sense that the system is configured in connection with at least one type of renewable energy source. Yet additional embodiments of such a system may be configured to further predict the occurrence of a leak. And finally, various embodiments of any such system should further be configured for the real-time communication of leak detection with an interested party, thereby facilitating efficiency from detection, location, and communication, and thus providing such an interested party with the ability to stop, fix, and/or prevent such a leak as quickly as possible.

SUMMARY OF THE INVENTION

The present invention is directed to system and method for identifying, locating, and communicating the presence of a leak within a piping system, such as those configured for the transport of water, oil, and/or natural gas. More specifically, at least one embodiment of such a leak localization system comprises the use of at least one emitting device configured to propagate at least one acoustic pulse throughout the internal cavity of the pipe—i.e., the portion of the pipe wherein the relevant fluid is disposed. Such an emitting device may further be configured in connection with at least one fluidic microphone, configured to amplify the acoustic pulse, and thereby increase the range thereof. Distally disposed in relation to the emitting device(s) may be at least one frequency sensing device, which may be configured to detect a frequency of the propagated acoustic pulse. In various embodiments, such emitting device(s), fluidic microphone(s), and frequency sensing device(s) may be interconnected with at least one communications hub, which may configured to collect and transmit data to at least one processor. Upon the detection of a leak, such at least one processor may be configured to subsequently determine the location of such a leak, such as through the use of an interconnected global positioning system, and subsequently convey such information to an interested third party for remedial action.

For instance, in at least one embodiment of the present invention, a pipe may comprise an elongated structure, such that the same extends across a substantial distance, whether in a straight, longitudinal fashion, a curved and radial fashion, an irregular fashion, or otherwise. As may be understood, such a pipe may be defined by an exterior surface and an internal chamber, wherein such internal chamber is defined according to at least one internal wall, whether comprising a circular cross-section or otherwise. Within such internal chamber may reside at least one fluid, whether comprising water, oil, natural gas, or otherwise, wherein such a fluid may be transported from a proximal end of such pipe to a distal end thereof. Such a pipe may optionally comprise a substantially cylindrical shape, a square or rectangular shape, a hexagonal or octagonal shape, a triangular prism shape, or any other pipe shape whether now known or hereafter developed. Such a pipe may comprise an open-end construction or a closed-end construction.

In at least one embodiment of the present invention, such a pipe may contain certain components disposed therein, such as at, or near the proximal end and/or distal end. Specifically, disposed within such internal chamber may be a first emitting device and a second emitting device, or a greater number thereof. Such first and second emitting devices may be configured to transmit an acoustic pulse and/or a sound wave, which may travel along the length of the pipe. Such a first and/or second emitting device may comprise, for instance, an acoustic pulse reflectometry sensor; however, alternative sensors and/or devices configured to emit an acoustic pulse and/or sound wave are envisioned herein.

Further, because the length of a given pipe may span many, many miles, it may be understood the first and/or second emitting device(s) may be insufficient to propagate an acoustic pulse and/or sound wave throughout a sufficient amount thereof, whether consisting of the entirety of the pipe, or otherwise. For instance, it may be commercially inviable to dispose numerous such emitting device(s), such that the entirety of the pipe is able to be analyzed via the acoustic pulses emitted therefrom. Indeed, as previously stated, conventional sensors, such as those of which the emitting device(s) described herein may be comprised, typically can only propagate such a sound wave for a distance of approximately eight hundred meters within an open and/or semi-closed geometric space, such as a tube.

In light thereof, the emitting device(s) of at least one embodiment of the present invention may be disposed in connection with at least one amplification device, wherein such amplification device may be configured to amplify the acoustic pulse generated by the emitting device, thereby enabling further propagation thereof within the tube. For instance, the amplification device of at least one embodiment of the present invention may comprise an ultra-hydrophone, or some other fluidic microphone, which may itself comprise a piezoelectric transducer configured to generate electric potential upon a pressure change. In so doing, the acoustic pulse generated by the emitting device(s) of the present invention may therefore propagate a greater distance within the tube. For instance, in at least one embodiment of the present invention, the acoustic pulse generated by the emitting device(s) may instead propagate for approximately 16,500 meters, or approximately ten land miles. As may be understood, the term approximately, as used herein, is merely meant to convey the standards or error, as may be understood by one of ordinary skill in the art.

Disposed in acoustic communication with such first and second emitting devices may be a frequency sensing device, or a plurality thereof, wherein such frequency sensing device(s) may be configured to detect a frequency measurement. Such a frequency measurement may comprise, for instance, a measurement of the frequency and/or amplitude of the sound wave and/or acoustic pulse emitted by the emitting device(s). In at least one embodiment, such frequency sensing device(s) may comprise a piezo-electric crystal sensor, or any other similar sensor configured to detect the frequency of a sound wave.

In view of the above, it may be understood the frequency sensing device(s) of at least one embodiment of the present invention may disposed at disparate points along the pipeline. In at least one embodiment, a first frequency sensing device may be configured to detect a normal frequency—i.e., the normally desirable frequency expected of the acoustic pulse emitted from the first emitting device. As may be understood, such a normal frequency may be dependent upon, for instance, the type of fluid disposed within the pipe, the cross-sectional shape of the pipe itself, the mass flow of the fluid within the pipe, and other similar such variables. Accordingly, in at least one embodiment, such a first frequency sensing device may be disposed at the proximal end of the pipe, such as distally adjacent or nearly-adjacent to the first emitting device. In so doing, the various variables which may affect the normal frequency may be easily accounted for, such that a normal frequency may be easily obtained.

In conjunction therewith, at least one additional frequency sensing device may be disposed along the pipe, at a location more distal than the first frequency sensing device. Such additional frequency sensing device(s) may be configured to determine a location frequency of the acoustic pulse—i.e., the frequency at the discrete location of the pipe in which the frequency sensing device is placed. By comparing such location frequency with the normal frequency, a frequency differential may be determined. And if such frequency differential is found to be abnormal, such as in instances wherein the frequency differential is found to be greater than a predetermined acceptable amount, it may be understood that the presence of a leak may be identified.

As may be understood, the above interplay between the emitting device(s) and the frequency sensing device(s) may be sufficient to identify that a leak is occurring, such as when an abnormal frequency differential is identified at a specific frequency sensing device. However, it may be understood the identification of such an abnormal frequency differential merely identifies a leak along a section of the pipe, and not the discrete location thereof.

In view thereof, the emitting device(s) and the frequency sensing device(s) of at least one embodiment of the present invention may be configured in connection with at least one control system, wherein such a control system may comprise a plurality of components configured to read the data generated by the emitting device(s) and frequency sensing device(s), make calculations and other inferences relating thereto, and subsequently transmit the pertinent data to at least one control center. Alternatively, such data may instead be transmitted to the control center for the relevant calculations, inferences, and localization procedures.

For instance, in at least one embodiment, such a control system may comprise at least one routing device interconnected with at least one processor configured in connection with a global positioning system. Accordingly, it may be understood the pertinent data from the emitting device(s) and the frequency sensing device(s) may be collected and processed via the processor, which may utilize the interconnected global positioning system to determine location data relevant to the abnormal frequency differential, all of which may be transmitted to the control center via the routing device.

In accordance with the above, such at least one processor may be disposed in connection with a memory component which may have computer-readable instructions disposed thereon. For instance, such a memory component may have various software structures configured to enable the processor to perform functions. As an example, such a processor may be configured, in at least one embodiment, to perform a measurement method, which may be configured to identify the location of a leak within the pipe.

In one embodiment, such a measurement method may comprise an evaluation module configured to receive certain inputs, such as sensor data—i.e., the normal frequency, location frequency, and the frequency differential, as well as any other data associated with other sensors—and output other information, such as the leak location. Such an evaluation module may further be configured to analyze the foregoing inputs in view of alternative types of information, including regulatory data, which may comprise, for instance, any relevant rules and regulations proffered by ATEX or any other regulatory agency. Similarly, such evaluation module may likewise receive, store, and analyze pipe data relating to the specific pipe at issue. Such pipe data may comprise, for instance, the diameter of the pipe, the length of the pipe, the thickness of the pipe, the material of the pipe, the presence and location of pipe fittings and other such components. Likewise, such evaluation module may receive fluid data, such as the type of fluid and/or product moving through the pipe and the material properties thereof, including the density, salinity, temperature, and other such properties. As may be understood, such an evaluation module may further be configured to account for fluid dynamics data such as, for instance, the fluid flow within the pipe, such as the mass flow rate thereof, and the frictional relationship between the fluid and the pipe itself.

In various embodiments of the present invention, such at least one control system may be powered through a variety of different means. For instance, in at least one embodiment of the present invention, such a control system may be disposed in connection with a power system, such as a solar panel, which may be configured to provide renewable sources of energy to the control system, and any components interconnected therewith. Alternative types of power systems are envisioned herein, such as a hydrokinetic system, a wind-based system, or some other similar such system configured to provide renewable energy dependent upon the location of the control system at issue. As may be understood, any such power system may be disposed at a singular location along the pipe, such that power is routed to any necessary components, or may alternatively be disposed at a variety of locations longitudinally disposed along the pipe. Further, as may be understood, alternative energy sources are likewise envisioned herein, such as those conventional non-renewable energy sources.

In at least one further embodiment, such emitting device(s) and frequency sensing device(s) may also be configured in connection with at least one mass flow sensor, which may be configured to monitor the mass flow of the material within the pipe. Accordingly, such a mass flow sensor may be configured to indicate a time at which an object approaches the same, or otherwise is set to approach a given location within the pipe. In so doing, another dimension of leak detection may be employed by the leak localization system of the present invention, as any variance in the mass flow rate of the fluid within the pipe may be identified via processes akin to those discussed in relation to the frequency sensing device(s). In other words, a first mass flow sensor may be disposed at or near the proximal end of the pipe, in order to determine a normal mass flow, whereas a second mass flow sensor, or a plurality thereof, may be disposed at a location distal from the first mass flow sensor, in order to determine a location mass flow. Upon comparison of the normal mass flow and the location mass flow, a mass flow differential may be determined. As may be understood, such data may likewise be input into the measurement method described heretofore to assist in the localization of a leak.

These and other objects, features, and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

The present invention is directed towards a leak localization system 100 configured to identify, locate, and predict the presence of a leak within a piping system configured to transport water, oil, natural gas, or some other fluid and/or material, and to subsequently communicate the same to an owner thereof, or some other interested party. More specifically, various embodiments of the present invention are configured to utilize at least one emitting device to propagate an acoustic wave throughout the internal cavity of a pipe, with the intent of measuring the frequency of such acoustic wave via at least one distally disposed frequency sensing device to determine if any portion of the pipe has been compromised such that a leak has formed. As may be understood, because the application of the invention disclosed herein may vary according to the specific characteristics of the pipe at issue, the type of fluid and/or material transported therein, as well as a variety of other variables, the specific embodiments of the present invention may vary. As but one example, pipes of varying lengths may require a greater number of emitting devices and/or frequency sensing devices, which is inherently contemplated herein. Accordingly, both the foregoing summary as well as the following description is merely exemplary in nature.

Figure 1:
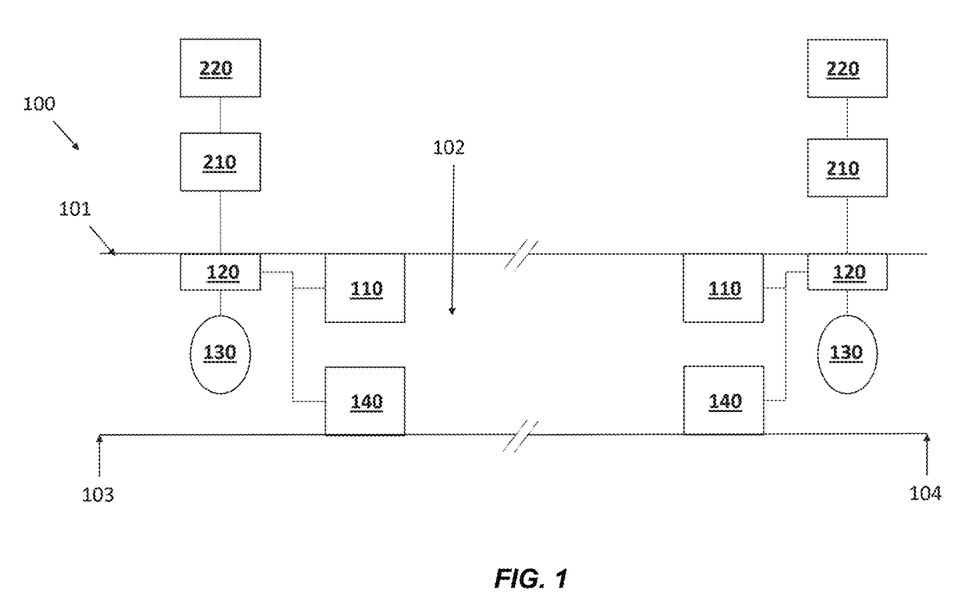
FIG. 1 depicts a schematic representation of a leak localization system, in accordance with at least one embodiment of the present invention.
Figure 2A:
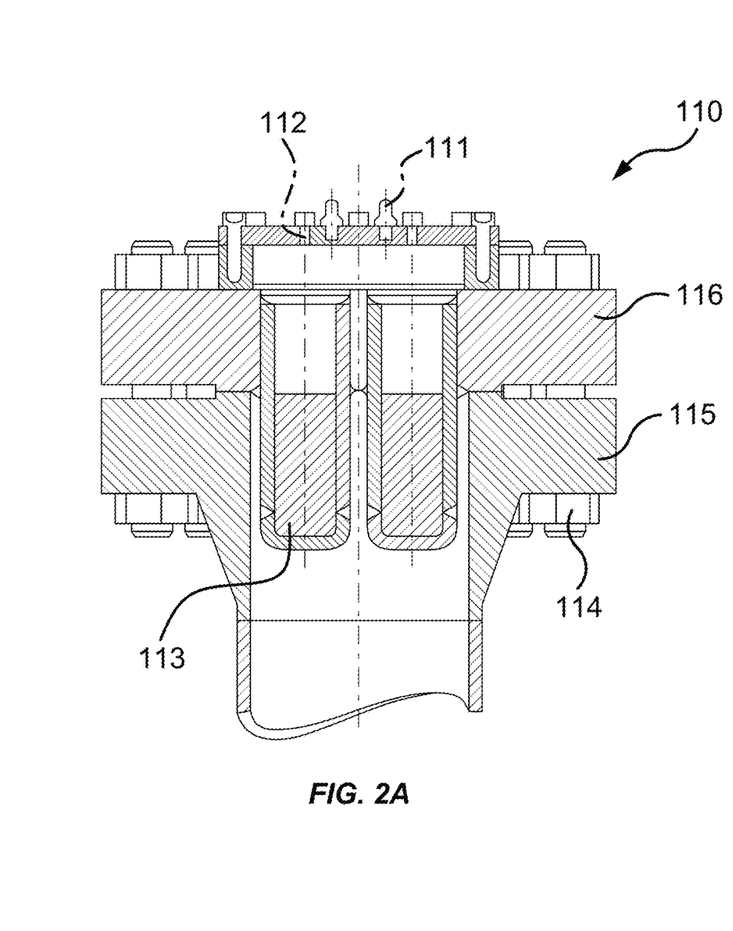
FIGS. 2A-2D depict alternative embodiments of a frequency sensing device, as used in the leak localization system described herein.
Figure 2B:
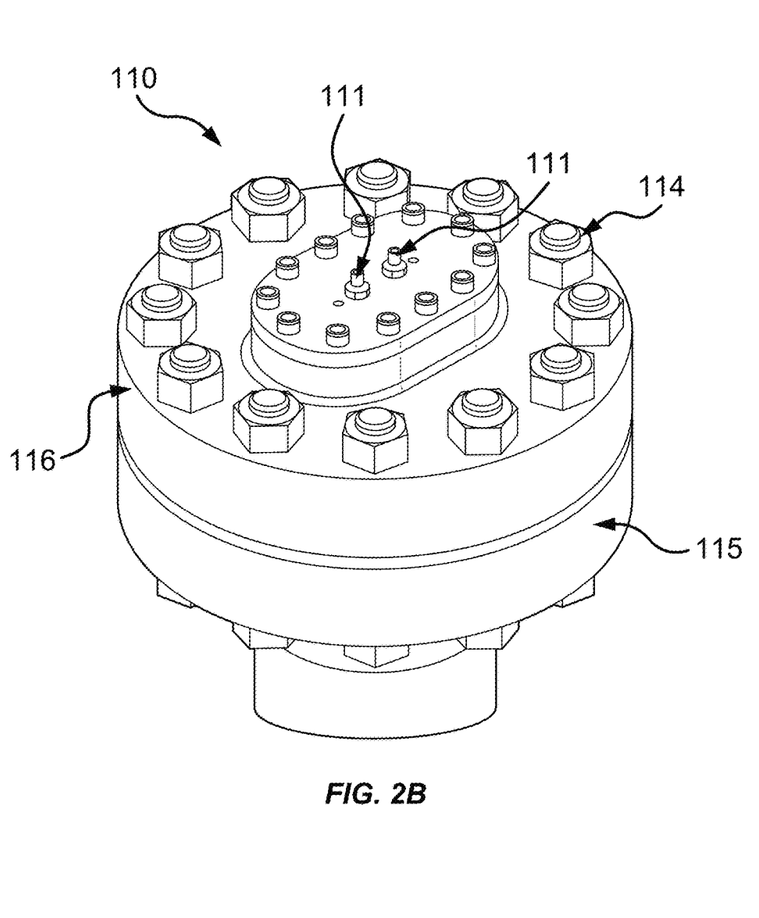
Figure 2C:
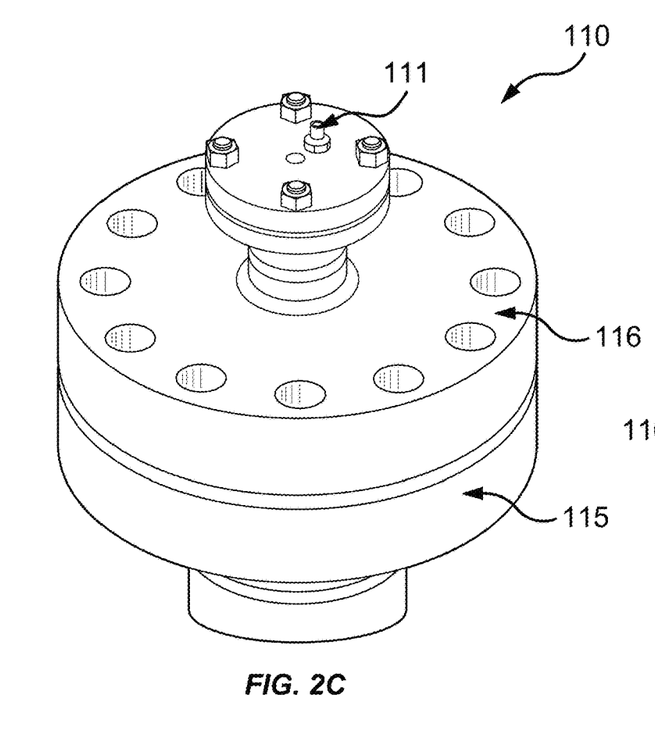
Figure 2D:
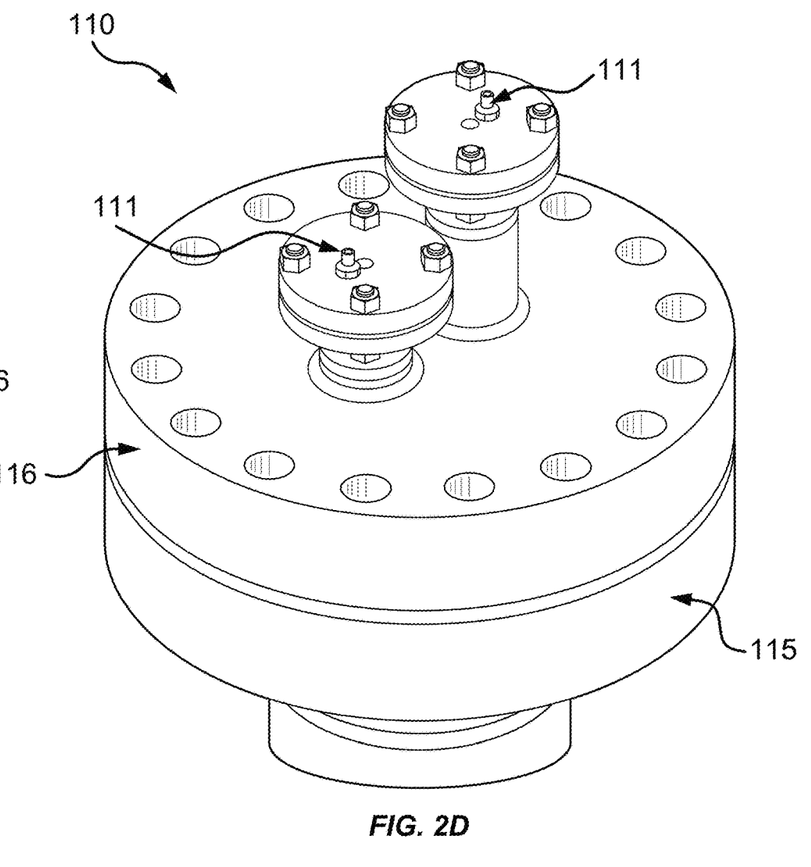

Depicted in FIG. 1 is a general schematic representation of the leak localization system 100 of at least one embodiment of the present invention, wherein a pipe 101 having an internal cavity 102 is configured for some fluid or other materials to flow from its proximal end 103 to its distal end 104. Disposed within such pipe 101 may be certain components configured to facilitate the measurement of various characteristics of the fluid, with the intent of identifying the presence of a leak and locating the same.

For instance, as depicted in FIG. 1, disposed within the internal cavity of such a pipe 101 may be one or more emitting devices 120. For instance, such a pipe 101 may have a first emitting device 120 disposed at the proximal end 103 of the pipe and a second emitting device 120 disposed at a location nearer the distal end 104 than the first emitting device 120. Such emitting device(s) 120 may be configured to emit an acoustic pulse, such as a sound wave, in one or more directions, such as in either direction along the longitudinal axis of the pipe 101. Such emitting device(s) 120 may comprise, for instance, an acoustic pulse reflectometry sensor; however, alternative components configured to likewise emit an acoustic pulse are contemplated herein. In at least one embodiment of the present invention, the acoustic pulse may be initially generated with a frequency between approximately 1 hertz and 10 megahertz.

As previously discussed, it is contemplated that the pipe 101 of at least one embodiment of the present invention may span a vast number of miles. Accordingly, in at least one embodiment of the present invention, such as the one depicted in FIG. 1, such an emitting device 120 may be disposed in connection with at least one amplification device 130, which may be configured to amplify the acoustic pulse and thereby enable further propagation thereof within the pipe 101. In at least one embodiment, such an emitting device 120 may comprise an ultra-hydrophone or some other fluidic microphone functioning as the at least one amplification device. For instance, such an emitting device 120 may comprise a piezoelectric transducer configured to generate an electric potential upon a pressure change, such as one generated by an acoustic pulse. In at least one embodiment, such an amplification device 130 of the emitting device 120 may be configured to enable the propagation of an acoustic pulse for approximately 16,500 meters, or approximately ten land miles. As may be understood, the term approximately, as used herein, is merely meant to account for standards of error, as may be understood by those having ordinary skill in the art.

With continued reference to FIG. 1, distally and/or proximally disposed within the pipe 101 in relation to the emitting device(s) 120 may be at least one frequency sensing device 110. Such a frequency sensing device 110 may be configured to detect a frequency measurement of the acoustic pulse generated by the emitting device 120. In at least one embodiment, such a frequency sensing device 110 may comprise a piezo-electric crystal sensor, or some other similar sensor configured to detect the frequency of the acoustic pulse.

Figure 3:
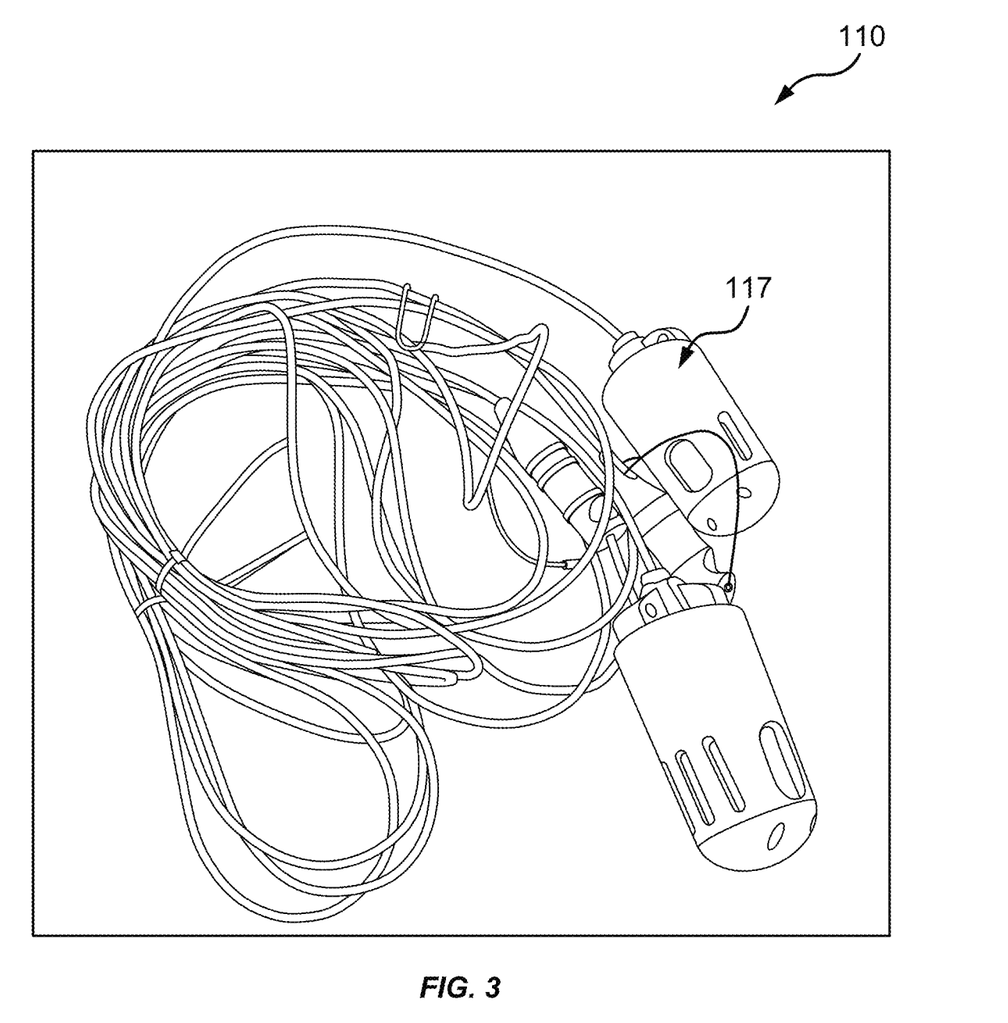
FIG. 3 depicts a frequency sensing device having a housing, in accordance with at least one embodiment of the present invention.

For instance, depicted in FIGS. 2A-2D are various embodiments of such a frequency sensing device 110. As may be seen, such a frequency sensing device 110 may have comprise an upper flange 116 attached to a lower flange 115 via at least one fastener component 114. In at least one embodiment, such upper flange 116 and lower flange 115 may form a flanged thermowell construction. Such upper flange 116 and lower flange 115 may be configured to cooperatively house at least one sensor component 113. Each such sensor component 113 may be configured to receive information relating to the frequency of the acoustic pulse via an input structure 111 interconnected with the sensor component 113 via a wiring component 112. As may be seen in the aforementioned Figures, the frequency sensing device 110 of various embodiments of the present invention may comprise alternative shapes, and may house one, two, or more sensor components 113 each having its own input structure 111. Further, as depicted in FIG. 3, such a frequency sensing device 110 may further comprise a housing 117 configured to house the aforementioned components, thereby providing greater security thereto. Such variability in structure of the frequency sensing devices 110 enables the same to be specifically tailored to the intended application thereof.

As previously discussed, such frequency sensing device(s) 110 may be configured at locations with the intent of detecting the acoustic pulse in varying states. For instance, a first frequency sensing device 110 disposed near the first emitting device 120 may be configured to detect a normal frequency—i.e., the expected frequency of the acoustic pulse. As may be understood, such normal frequency may depend on a variety of factors, such as the type of fluid disposed within the pipe 101, the cross-sectional shape of the pipe 101 itself, the material of the pipe 101, and the mass flow of the fluid.

Similarly, a more distally-disposed frequency sensing device 110 may be configured to detect a location frequency—i.e., a frequency of the acoustic pulse at the location at which the frequency sensing device 110 is located. Such location frequency may be compared with the normal frequency to determine a leak differential, which may be used to determine whether a leak has occurred. In other words, if there is a sufficient difference between the normal frequency and the location frequency, then it may be determined a leak has occurred within the pipe 101.

Returning to FIG. 1, the inner cavity 102 of the pipe 101 of at least one embodiment of the present invention may additionally have at least one mass flow sensor 140 disposed therein. Similar to the frequency sensing device 110, such mass flow sensor(s) 140 may be configured to detect the mass flow of the fluid within the pipe 101. And, similar to the frequency sensing device(s) 110, such mass flow sensor(s) 140 may be specifically located to determine a normal mass flow and a location mass flow, in order to determine a mass flow differential.

With continued reference to FIG. 1, it may be seen the emitting device(s) 120, and by extension the frequency sensing device(s) 110 and mass flow sensor(s) 140, as well as any other sensors or other structures disposed within the pipe 101, may be interconnected with at least one control system 210. Such a control system 210 may comprise at least one processor configured in connection with a routing device, which may be configured in communication with a global positioning system. Accordingly, the data of the various components disposed within the pipe 101 may be collected and processed via the processor, which may utilize the global positioning system to assist in locating the leak, while using the routing device to transmit the same to an interconnected control center.

Figure 5:
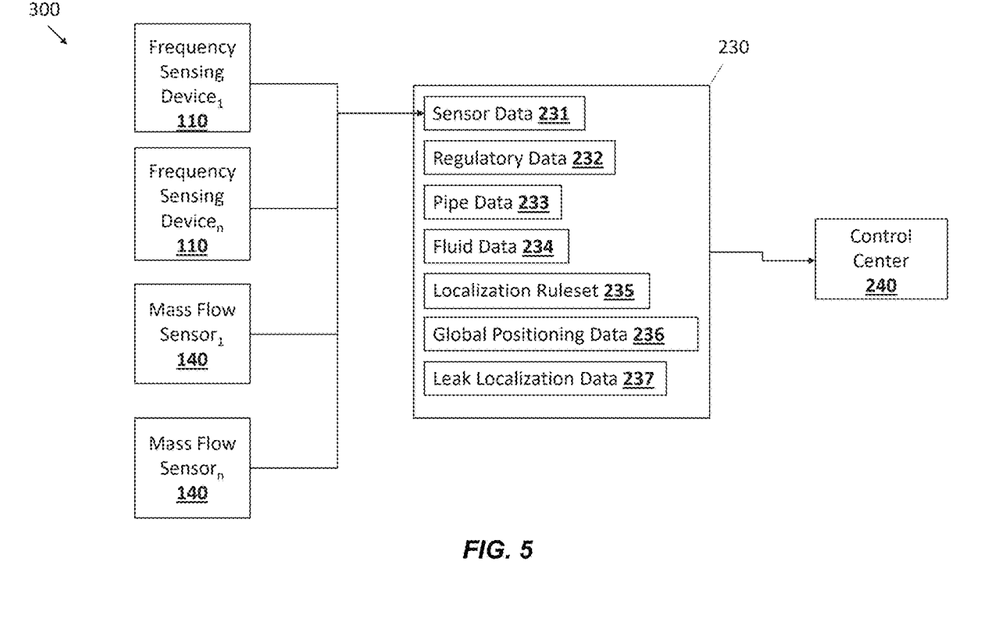
FIG. 5 depicts a schematic representation an evaluation module, in accordance with at least one embodiment of the present invention.

For instance, in at least one embodiment, such as depicted in FIG. 5, such a processor may be configured to employ a measurement method, which may comprise an evaluation module 230 configured to receive certain inputs in order to determine an output, such as leak localization data 237—i.e., the location of the leak within the pipe 101. In other words, because the frequency sensing device(s) 110 and any other components cannot be disposed along the entire length of the pipe, the processor may be utilized to precisely locate the same.

As may be seen in FIG. 5, such an evaluation module 230 may first receive various inputs from the components within the pipe, such as the frequency sensing device(s) 110 and the mass flow sensor(s) 140, which it may receive as sensor data 231. Such sensor data 231 may comprise the normal frequency of the emitting device 120 and the location frequency of the various frequency sensing devices 110 for the determination of the various frequency differentials. Similarly, such sensor data 231 may comprise the normal mass flow and the location mass flow, for the determination of the mass flow differentials of the various mass flow sensor(s) 140.

Being disposed in connection with the control center 240, such an evaluation module 230 may likewise receive certain inputs from the same. For instance, such an evaluation module 230 may receive and use regulatory data 232 to assist in the determination of whether a leak has occurred within the pipe 101. Regulatory data 232 may comprise, for instance, relevant rules and regulations promulgated by various organizations, such as ATEX or any other applicable governing body.

Likewise, the evaluation module 230 may utilize both pipe data 233 and fluid data 234 in its analysis. As may be understood, the pipe data 233 may comprise various information relating to the pipe 101 itself, such as its cross-sectional shape, its size, its material, the presence and location of various pipe fittings, and its geographic disposition, including whether or not the pipe at issue is disposed above-ground or below a body of water. In contrast, the fluid data 234 may comprise information relating to the fluid and/or material being transported within the pipe 101. For instance, fluid data 234 may comprise information relating to the density, salinity, viscosity, temperature, intended mass flow rate, and any other relevant characteristic inherent to, or otherwise relating to the fluid and/or material. As may be understood, both such pipe data 233 and fluid data 234 may be provided by the owner of the pipe 101 during the installation of the invention described herein, thereby ensuring the evaluation module 230 described herein is sufficiently tailored to its specific application.

With continued reference to FIG. 5, the evaluation module 230 may further comprise a localization ruleset 235 which may comprise an algorithm through which the foregoing pieces of data may be analyzed in order to locate the leak within the pipe 101, or even predict the future presence thereof. Such a localization ruleset 235 may employ a variety of analyses which, when made in combination with the global positioning data 236 provided by the interconnected global positioning system, may enable the evaluation module 230 of at least one embodiment of the present invention to determine the location of a leak to a high degree of accuracy. For instance, in at least one embodiment of the present invention, the location of a leak may be determined within an accuracy of approximately 100 to 1000 centimeters. As but one example, the localization ruleset 235 may be configured to use an ultrasonic reflectometry analysis to determine the location of the leak based on the frequency and amplitude of the frequency differential. Once a leak is localized within the pipe 101, leak localization data 237 may be generated, and may be transmitted to the control center 240. However, it may be understood that, in at least one alternative embodiment, the evaluation module 230 is performed at the control center 240, wherein the control system 210 instead merely collects and transmits the sensor data 231 thereto.

Returning now to FIG. 5, and as previously stated, at least one embodiment of the control system 210 discussed heretofore may comprise a routing device. Such a routing device may be configured for the secure transmission of any data from relating to the pipe 210, such as the sensor data 231 and/or leak localization data 237 to an interconnected control center 240. In at least one embodiment of the present invention, such a routing device may be configured as a site-to-multisite environment, such as a multisite virtual private network. In so doing, the interconnection between the control center 240 and the various routing devices of the various control systems 210 may be configured in a hub-and-spoke topology, such that each router is provided with a secure link to the control center 240. However, it may be understood alternative network designs are envisioned herein, whether now known or hereafter developed.

Figure 4:
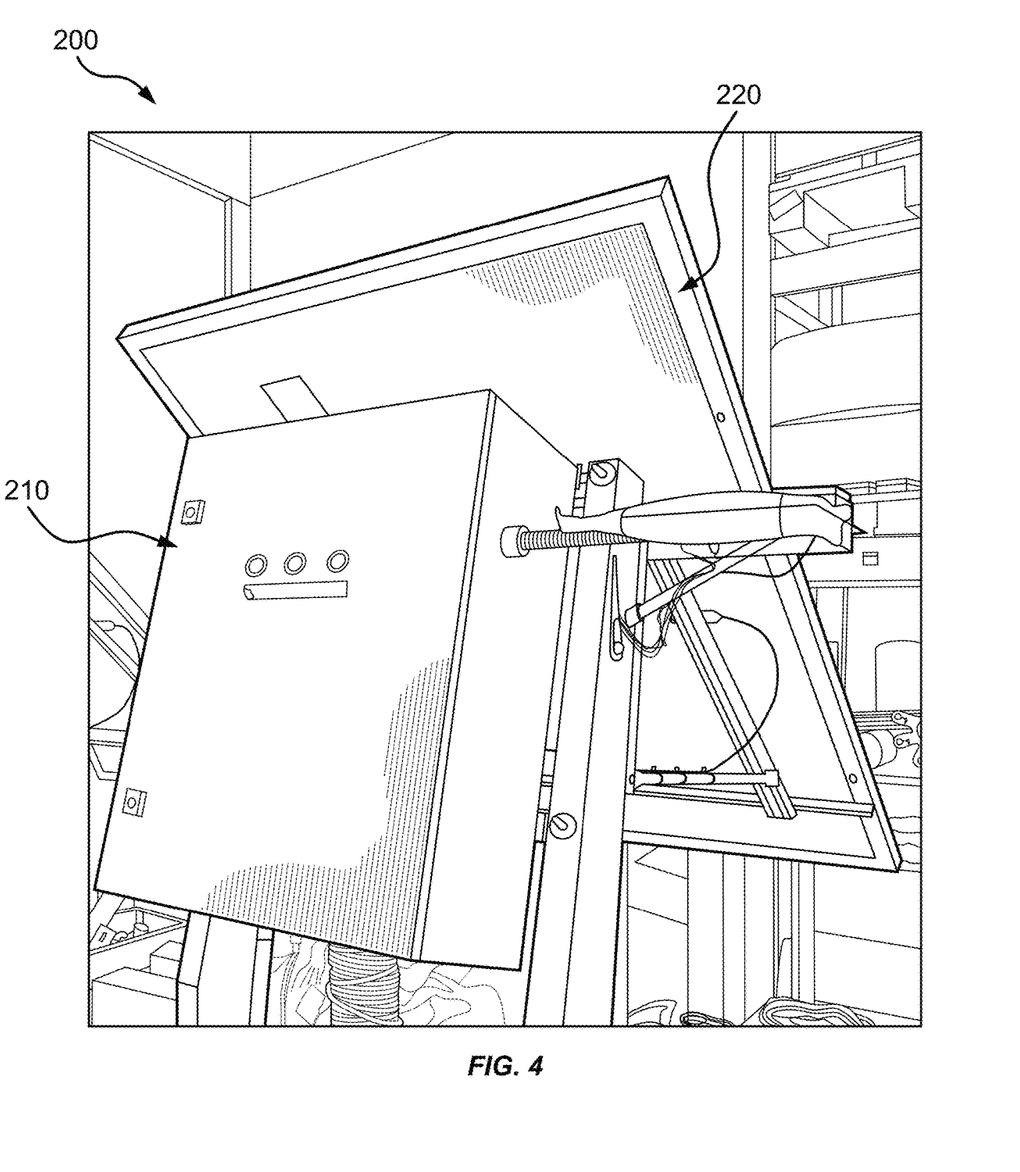
FIG. 4 depicts a control system disposed in connection with a power system, in accordance with at least one embodiment of the present invention.

With continued reference to FIG. 1, and additional reference to FIG. 4, it may be seen the control system 210 of at least one embodiment of the present invention may be interconnected with a power system 220, which may be configured to provide power to bot the control system 210, and the various components thereof, as well as the sensors or any other components disposed within the pipe 101. In at least one embodiment, such a power system 220 may be configured to utilize a renewable energy source. For instance, such a power system 220 may comprise at least one solar panel. Alternatively, such a power system 220 may be configured to utilize alternative forms of renewable energy, such as through a hydrokinetic system, a wind-based system, or any other renewable energy system, whether now known or hereafter developed. Further, the use of conventional, non-renewable energy sources within the power system 220 are likewise envisioned herein, whether in a hybrid system or otherwise, to ensure there are no power interruptions at the control system(s) 210. In various embodiments of the present invention, each control system 210 may have its own interconnected power system 220, or a plurality thereof may share a single interconnected power system 220.

As may be understood, once a leak has been detected and localized within the pipe 101, a notification thereof, as well as all pertinent data relating thereto, may be transmitted to the owner of the pipe 101 for the undertaking of remedial action. By continually performing the various tasks of the leak localization system 100 described herein, a leak may be promptly detected, and efficiently localized, thereby enabling such remedial action to be made as quickly as possible, thereby minimizing product loss.

Since many modifications, variations, and changes in detail may be made to the described preferred embodiment of the present invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A system for detecting and localizing a leak within a pipe, comprising:
   a pipe having a proximal end, a distal end, and an interior wall forming an internal cavity configured for a flow of at least one fluid therein from said proximal end to said distal end;
   at least one emitting device placed within said internal cavity near said proximal end, said at least one emitting device configured to generate at least one acoustic pulse;
   a first frequency sensing device proximally disposed within said internal cavity in relation to said at least one emitting device and in acoustic communication therewith, said first frequency sensing device configured to detect a normal frequency of said at least one acoustic pulse;
   a second frequency sensing device distally disposed within said internal cavity in relation to said first frequency sensing device and in acoustic communication with said at least one emitting device, said second frequency sensing device configured to detect a location frequency of said at least one acoustic pulse;
   a first mass flow sensor proximally disposed within said internal cavity in relation to said at least one emitting device, said first mass flow sensor configured to measure a normal mass flow of the fluid;
   a second mass flow sensor distally disposed within said internal cavity in relation to said first mass flow sensor, said second mass flow sensor configured to measure a location mass flow of the fluid;
   said at least one emitting device, first frequency sensing device, and second frequency sensing device, first mass flow sensor and the second mass flow sensor disposed in connection with at least one control system, said at least one control system comprising at least one processor configured in connection with at least one router;
   said at least one control system communicatively configured in connection with at least one global positioning system; and
   said at least one control system configured to determine leak localization data according to said normal frequency and said location frequency, said normal mass flow, and said location mass flow.

2. The system of claim 1, wherein a comparison between said normal frequency and said location frequency generates a frequency differential.

3. The system of claim 1, wherein said at least one router is communicatively configured in connection with at least one control center.

4. The system of claim 3, wherein said at least one router is communicatively configured in connection with said at least one control center via a site-to-multisite environment.

5. The system of claim 1, wherein said at least one emitting device comprises an acoustic pulse reflectometry sensor.

6. The system of claim 1, wherein said at least one emitting device is disposed in connection with at least one amplification device.

7. The system of claim 6, wherein said at least one amplification device comprises an ultra-hydrophone.

8. A system for detecting and localizing a leak within a pipe, comprising:
   a pipe having a proximal end, a distal end, and an interior wall forming an internal cavity configured for a flow of at least one fluid therein from said proximal end to said distal end;
   at least one emitting device placed within said internal cavity near said proximal end, said at least one emitting device configured to generate at least one acoustic pulse;
   said at least one emitting device disposed in connection with at least one amplification device, said at least one amplification device configured to amplify said at least one acoustic pulse;
   a first frequency sensing device proximally disposed within said internal cavity in relation to said at least one emitting device and in acoustic communication therewith, said first frequency sensing device configured to detect a normal frequency of said at least one acoustic pulse;
   a second frequency sensing device distally disposed within said internal cavity in relation to said first frequency sensing device and in acoustic communication with said at least one emitting device, said second frequency sensing device configured to detect a location frequency of said at least one acoustic pulse;
   at least two mass flow sensors disposed within said internal cavity, said at least two mass flow sensors cooperatively configured to generate a mass flow differential;
   said at least one emitting device, first frequency sensing device, second frequency sensing device, and at least two mass flow sensors disposed in connection with at least one control system, said at least one control system comprising at least one processor configured in connection with at least one router, said at least one router communicatively connected to at least one control center; said at least one control system communicatively configured in connection with at least one global positioning system; and said at least one control center configured to determine leak localization data according to a frequency differential generated by said normal frequency and said location frequency and said mass flow differential.

9. The system of claim 8, wherein said at least one acoustic pulse is configured to propagate for approximately 16,500 meters.

10. The system of claim 8, wherein said leak localization data comprises an accuracy between approximately 100 centimeters to 1000 centimeters.

11. The system of claim 8, wherein said at least one control center determines said leak localization data according to evaluation module, said evaluation module comprising pipe data and fluid data provided by an owner of said pipe.

12. The system of claim 11, wherein said evaluation module further comprises regulatory data.

13. The system of claim 11, wherein said evaluation module further comprises a localization ruleset configured to localize a leak within said pipe according to an ultrasonic reflectometry analysis.

14. A system for detecting and localizing a leak within a pipe, comprising:
- a pipe having a proximal end, a distal end, and an interior wall forming an internal cavity configured for the flow of at least one fluid therein from said proximal end to said distal end;
- at least one emitting device placed within said internal cavity near said proximal end, said at least one emitting device configured to generate at least one acoustic pulse;
- said at least one emitting device disposed in connection with at least one amplification device, said at least one amplification device configured to amplify said at least one acoustic pulse;
- a first frequency sensing device proximally disposed within said internal cavity in relation to said at least one emitting device and in acoustic communication therewith;
- a second frequency sensing device distally disposed within said internal cavity in relation to said first frequency sensing device and in acoustic communication with said at least one emitting device;
- said first frequency sensing device and said second frequency sensing device cooperatively configured to generate sensor data, said sensor data comprising a frequency differential;
- at least two mass flow sensors disposed within said internal cavity, said at least two mass flow sensors configured to generate sensor data, said sensor data comprising a mass flow differential;
- said at least one emitting device, first frequency sensing device, and second frequency sensing device, and at least two mass flow sensors disposed in connection with at least one control system, said at least one control system comprising at least one processor configured in connection with at least one router, said at least one router communicatively connected to at least one control center; and
- said at least one control system configured to localize a leak according to an evaluation module, said evaluation module comprising a localization ruleset configured to utilize the sensor data, plus regulatory data, pipe data, fluid data, and global positioning data to determine leak localization data.

15. The system of claim 14, wherein said at least one amplification device comprises an ultra-hydrophone.

16. The system of claim 14, wherein said at least one emitting device comprise an acoustic pulse reflectometry sensor.

17. The system of claim 14, wherein said leak localization data has an accuracy of approximately 100 centimeters to 1000 centimeters.

18. The system of claim 14, wherein said leak localization data is transmitted to the owner of said pipe.

* * * * *